United States Patent
Vainapel et al.

(10) Patent No.: US 9,641,654 B2
(45) Date of Patent: May 2, 2017

(54) ROBUST DECODING OF WIRELESS LAN RESPONSE PACKETS

(71) Applicant: Apple Inc., Cupertino, CA (US)

(72) Inventors: Koby Vainapel, Herzliya (IL); Yoel Boger, Shoham (IL); Gilad Kirshenberg, Ra-Anana (IL); Micha Anholt, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 14/499,606

(22) Filed: Sep. 29, 2014

(65) Prior Publication Data

US 2016/0094689 A1     Mar. 31, 2016

(51) Int. Cl.
*H04L 12/50*     (2006.01)
*H04L 29/06*     (2006.01)

(52) U.S. Cl.
CPC ............. *H04L 69/28* (2013.01); *H04L 69/22* (2013.01)

(58) Field of Classification Search
CPC ................................ H04L 69/28; H04L 69/22
See application file for complete search history.

(56) References Cited

U.S. PATENT DOCUMENTS

| | | | |
|---|---|---|---|
| 7,469,297 B1* | 12/2008 | Kostoff, II | H04L 29/12839 370/392 |
| 7,826,429 B2 | 11/2010 | Ronen et al. | |
| 7,882,412 B2 | 2/2011 | Nanda | |
| 2004/0111663 A1* | 6/2004 | Lewis | H03M 13/03 714/776 |
| 2014/0341234 A1* | 11/2014 | Asterjadhi | H04L 69/324 370/474 |
| 2015/0288427 A1* | 10/2015 | Wang | H04W 72/1273 370/329 |

* cited by examiner

*Primary Examiner* — Ayaz Sheikh
*Assistant Examiner* — Hai-Chang Hsiung
(74) *Attorney, Agent, or Firm* — Meyertons Hood Kivlin Kowert & Goetzel, P.C.; Jeffrey C. Hood; Matthew C. Washburn

(57) ABSTRACT

Embodiments described herein relate to a system and method for improving a rate of success in receiving response packets, such as 802.11 Acknowledge (ACK), Block Acknowledge (BACK), and Clear-To-Send (CTS) packets. In one embodiment, a wireless device may transmit one or more first packets according to a wireless communication protocol, and may then receive a second packet. The wireless device may determine that the receiving follows the transmitting by a specific duration of time that is specified by the wireless communication protocol for a response packet to follow one or more communication packets to which it responds. Based at least in part on this determining, the wireless device may further determine that the second packet is a response packet responding to the one or more first packets, without decoding a portion of the second packet that identifies a packet type of the second packet.

18 Claims, 6 Drawing Sheets

ROBUST DECODING OF WIRELESS LAN RESPONSE PACKETS

TECHNICAL FIELD

The present application relates to wireless devices, and more particularly to providing improved communication robustness in Wireless LAN systems.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard and are marketed under the Wi-Fi brand name. WLAN networks link one or more devices to a wireless access point, which in turn provides connectivity to the wider Internet.

In 802.11 systems, devices that wirelessly connect to each other are referred to as "stations" or STA for short. Wireless stations can be either wireless access points or clients. Access points (APs), also referred to as wireless routers, act as base stations for the wireless network. APs transmit and receive radio frequency signals for communication with wireless client devices. APs also typically couple to the Internet in a wired fashion. Wireless clients operating on an 802.11 network can be any of various devices such as laptops, tablet devices, smart phones, or fixed devices such as desktop computers. Wireless client devices are referred to herein as stations, STA devices, or simply as "STA". Wireless client devices are also referred to herein as mobile devices.

In 802.11 systems, a receiving station must typically acknowledge proper receipt of unicast packets sent by an initiating station. For example, receipt may be acknowledged by the receiving station by sending one of various types of response packets, such as an acknowledge packet (ACK), a block acknowledge packet (BACK), or a clear-to-send packet (CTS), to the initiating station. If the proper response packet is not received by the initiating station, then the initiating station assumes the one or more unicast packets were not received, resulting in retransmission of the one or more unicast packets. This results in degraded throughput on the communication channel.

Therefore, improvements are desired in wireless communication systems. In particular, it would be desirable to provide improvements with respect to acknowledgement of receipt of communication packets in WLAN systems.

SUMMARY

Embodiments described herein relate to a system and method for improving a rate of success in receiving response packets in wireless communication systems, such as 802.11 WLAN systems.

In one embodiment, a method for wireless communication is presented. The wireless device may transmit one or more first packets according to a wireless communication protocol, and then receive a second packet. The wireless device may determine that the receiving follows the transmitting by a specific duration of time, wherein the wireless communication protocol specifies that a response packet responding to one or more packets is to follow transmission of the one or more packets by the specific duration of time. Based at least in part on this determination, the wireless device may further determine that the second packet is a response packet responding to the one or more first packets, without decoding at least a portion of the second packet that identifies a packet type of the second packet. The portion of the second packet that is not decoded may include a Frame Control field. The response packet may comprise at least one of an Acknowledge (ACK) packet, a Block Acknowledge (BACK) packet, and a Clear-To-Send (CTS) packet.

The wireless device may conclude that the one or more first packets were successfully received, based on the determining that the second packet is a response packet responding to the one or more first packets.

In one embodiment, the wireless device may determine that a specific portion of the second packet matches the specific portion of an expected value of the second packet. The determining that the second packet is a response packet responding to the one or more first packets is further based on the determining that a specific portion of the second packet matches the specific portion of an expected value of the second packet.

In one embodiment, the wireless device may decode only a physical layer (PHY) header of the second packet. The wireless device may determine that a specific portion of the decoded PHY header of the second packet matches the specific portion of an expected value of the PHY header of the second packet. The determining that the second packet is a response packet responding to the one or more first packets may be further based on the determining that the specific portion of the decoded PHY header of the second packet matches the specific portion of the expected value of the PHY header of the second packet. The specific portion of the decoded PHY header may comprise a field specifying a length of the packet.

In one embodiment, the wireless device may determine an expected value of a first portion of the second packet, wherein an actual value comprised in the first portion of the second packet is not decoded. The wireless device may decode a second portion of the second packet according to a decoding algorithm, wherein the decoding algorithm utilizes a value in the first portion to decode the second portion, wherein the decoding is performed by utilizing the expected value of the first portion rather than the actual value of the first portion. The wireless device may further determine that at least a portion of the decoded second portion of the second packet matches an expected value of a corresponding portion of the second portion of the second packet. The determining that the second packet is a response packet responding to the one or more first packets may be further based on the determining that the decoded second portion of the second packet matches the expected value of the second portion of the second packet. For example, the second portion of the second packet may comprise a frame check sequence (FCS) field. As another example, the first portion of the second packet may comprise a Media Access Control (MAC) header.

In one embodiment, the wireless device may decode at least a first portion of the second packet comprising a scrambler initialization field. The wireless device may then descramble at least a second portion of the second packet using a value of the decoded scrambler initialization field. The wireless device may determine that a value of the second portion of the second packet descrambled using the value of the decoded scrambler initialization field does not match an expected value of the second portion of the second packet. In, the wireless device may descramble at least the second portion of the second packet using one or more other possible scrambler initialization values, different from the value of the decoded scrambler initialization field. The wireless device may further determine that the second portion of the second packet descrambled using one of the one or more other values of the decoded scrambler initialization field matches the expected value of the second portion of the second packet. The determining that the second packet is a response packet responding to the one or more first packets may be further based on the determining that the second portion of the second packet descrambled using one of the one or more other values of the decoded scrambler initialization field matches the expected value of the second portion of the second packet. The second portion of the second packet may comprise a frame check sequence (FCS) field.

In one embodiment, a wireless device is disclosed, which comprises a radio and a processor configured to cause the wireless device to perform methods such as those described above.

In one embodiment, a non-transitory computer-readable medium is disclosed, which stores instructions executable by a processor of a wireless device to cause the wireless device to perform methods such as those described above.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
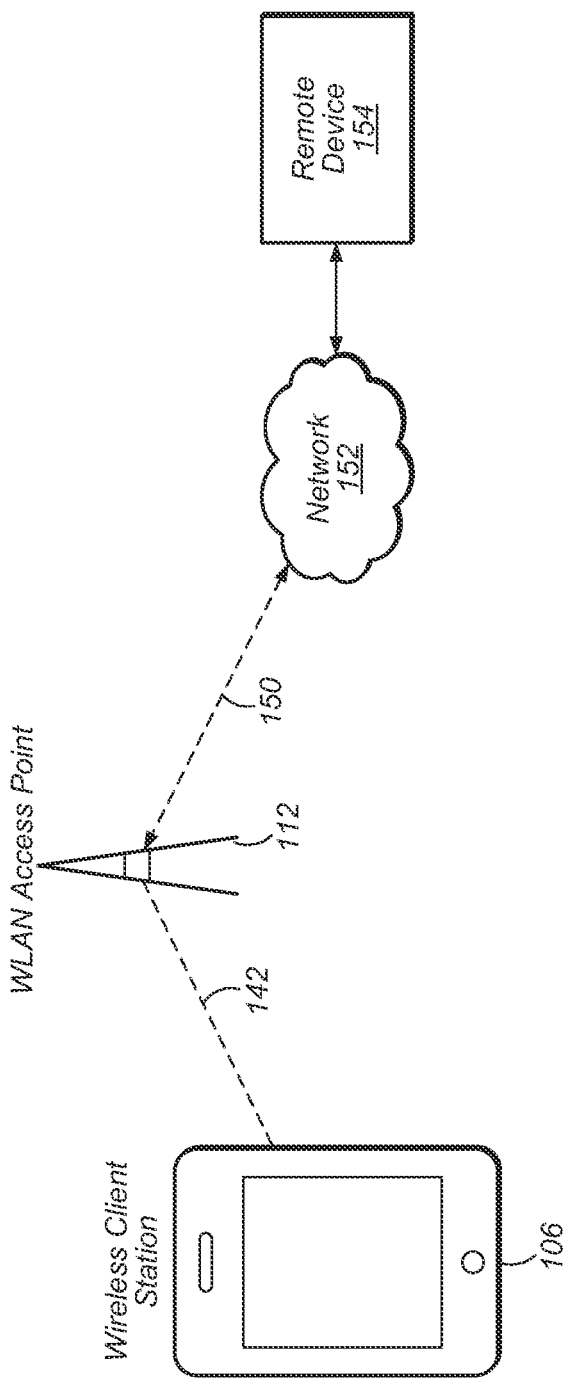
FIG. 1 illustrates an example WLAN communication system, according to one embodiment.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present disclosure.
ACK: Acknowledge packet
AP: Access Point
BACK: Block Acknowledge packet
CTS: Clear-To-Send packet
FCS: Frame Check Sequence
GSM: Global System for Mobile
LTE: Long-Term Evolution
LTE-A: Long-Term Evolution Advanced
MAC: Media Access Control
MPDU: MAC Protocol Data Unit
MSDU: MAC Service Data Unit
PLCP: Physical Layer Convergence Protocol
PPDU: PLCP Protocol Data Unit
PSDU: PLCP Service Data Unit
RA: Receiver Address
STA: Station device, such as a client mobile device
TA: Transmitter Address
WCDMA: Wideband Code Division Multiple Access
WLAN: Wireless Local Area Network Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include WiFi or both cellular and WiFi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN.

Wireless Device—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—WLAN System

FIG. 1 illustrates an example WLAN system according to one embodiment. As shown, the exemplary WLAN system includes a wireless client station (STA) 106 communicating over a wireless communication channel 142 with an Access Point (AP) 112. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station.

The WLAN system may be configured to operate according to any of various communications standards, such as the various IEEE 802.11 standards.

Figure 2:
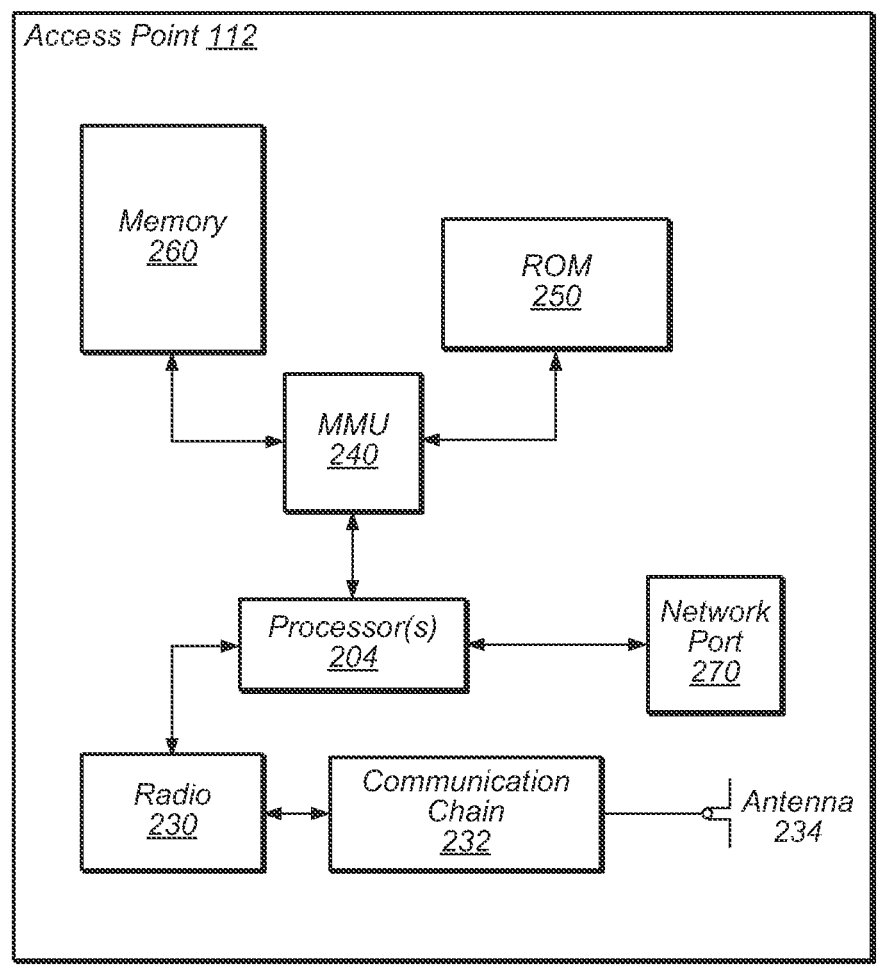
FIG. 2 illustrates an example simplified block diagram of a WLAN Access Point (AP), according to one embodiment.

FIG. 2—Access Point Block Diagram

FIG. 2 illustrates an exemplary block diagram of an Access Point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry 230. The antenna 234 communicates with the wireless communication circuitry 230 via communication chain 232. Communication chain 232 may comprise one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc.

The processor(s) 204 of the AP 112 may be configured to implement part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof.

Figure 3:
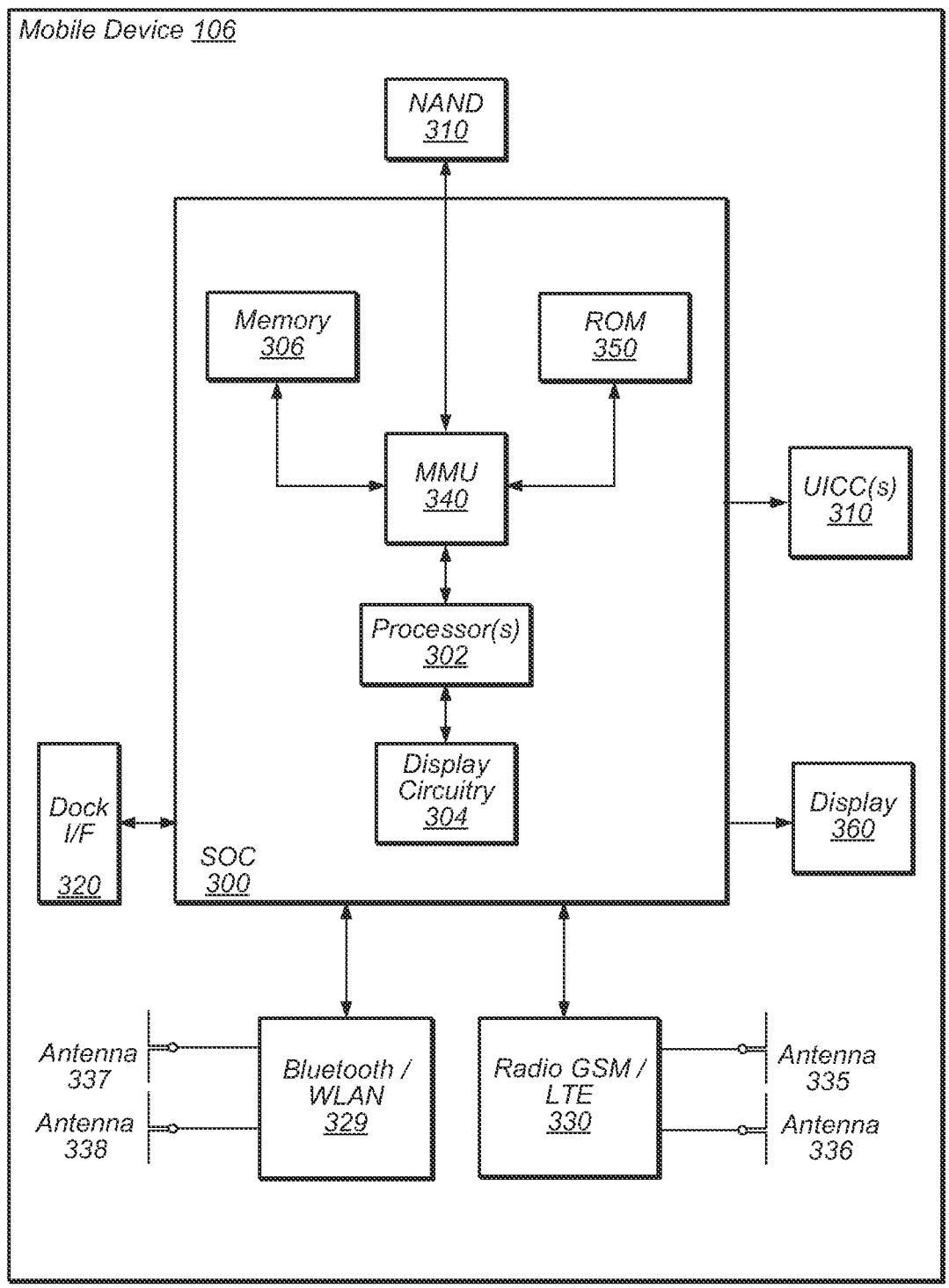
FIG. 3 illustrates an example simplified block diagram of a mobile device, according to one embodiment.

FIG. 3—Client Station Block Diagram

FIG. 3 illustrates an example simplified block diagram of a STA 106. As shown, the STA 106 may include a system on chip (SOC) 300, which may include portions for various purposes. The SOC 300 may be coupled to various other circuits of the STA 106. For example, the STA 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., Bluetooth™ and WLAN circuitry). The STA 106 may further comprise one or more smart cards 310 that comprise SIM (Subscriber Identity Module) functionality, such as one or more UICC(s) (Universal Integrated Circuit Card(s)) cards 310. The cellular communication circuitry 330 may couple to one or more antennas, such as antennas 335 and 336 as shown. The short range wireless communication circuitry 329 may also couple to one or more antennas, such as antennas 337 and 338 as shown. Alternatively, the short range wireless communication circuitry 329 may couple to the antennas 335 and 336 in addition to, or instead of, coupling to the antennas 337 and 338. The short range wireless communication circuitry 329 may comprise multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the STA 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the STA 106 may be configured to communicate wirelessly using one or more radio access technologies (RATs). The STA 106 may be configured to communicate according to a WLAN RAT for communication in a WLAN network, such as that shown in FIG. 1. The STA 106 may also be configured to communicate on other RATs, such as cellular RATs, as desired.

As described herein, the STA 106 may include hardware and software components for implementing the features described herein. For example, the processor 302 of the STA 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the STA 106, in conjunction with one or more of the other components 300, 304, 306, 310, 320, 330, 335, 340, 350, 360 may be configured to implement part or all of the features described herein.

As used herein, the term "STA" may refer to a device such as the STA 106 described above.

Robust Decoding of Response Packets

In some wireless systems, such as 802.11 systems, for example, most unicast packets sent by an initiating station are acknowledged by the receiving station, e.g., by an acknowledge packet (ACK), a block acknowledge packet (BACK), or a clear-to-send packet (CTS) sent by the receiving station. Such response packets are intended to confirm to the initiating station that one or more unicast packets transmitted by the initiating station were properly received by the receiving station. If the proper response packet is not received by the initiating station, then the initiating station assumes the one or more unicast packets were not received, resulting in retransmission of the one or more unicast packets. This results in degraded throughput on the communication channel, which may lead to reduced data rates and power efficiency.

However, in some circumstances, the unicast packets may have been properly received by the receiving station, and only reception of the response packet may have failed. For example, an interferer near the initiating station may disrupt reception of the response packet by the initiating device, without causing significant disruption to reception of the unicast packets by the receiving station. Thus, throughput may be degraded by retransmission of the unicast packets, even though they were transmitted successfully on the first attempt.

Therefore, throughput of a wireless system may be improved by improving the success rate of receiving the response packets. Further, improving successful reception of response packets may be achieved at a lower cost than improving reception of all communication packets because response packets are typically short packets with predictable contents or other known characteristics. Knowledge of such characteristics may be leveraged to verify that a received packet is a response packet, even if the packet has been corrupted. Examples of known characteristics of some response packets may include the timing between a packet and its response packet, the length of the response packet, and the contents of at least a portion of the response packet. Other characteristics may also be known.

Figure 4:
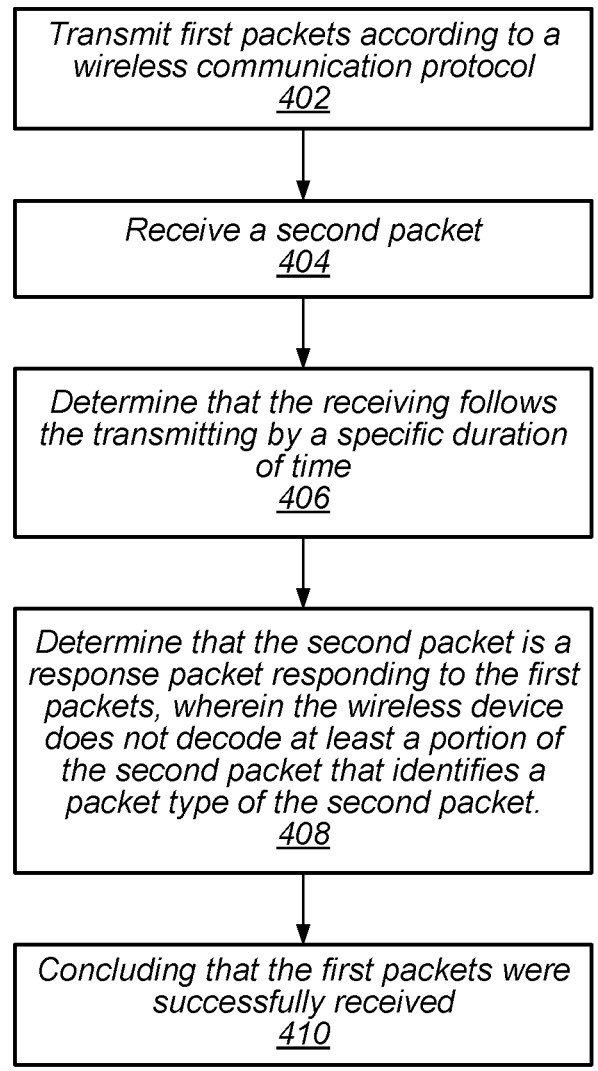
FIG. 4 is a flowchart diagram illustrating an exemplary method for successfully receiving a response packet by using timing of the response packet, according to one scenario.

FIG. 4—Timing of the Response Packet

FIG. 4 is a flowchart diagram illustrating an exemplary method for successfully receiving a response packet by using timing of the response packet, according to one scenario. The method shown in FIG. 4 may be used in conjunction with any of the computer systems or devices shown in the above Figures, among other devices. If desired, it may be the case that the method is more particularly implemented by a wireless device, such as the mobile device 106 or the access point 112, or, more specifically, by a WLAN/Wi-Fi chipset within a wireless device. Some of the method elements shown may be performed concurrently or in a different order than shown, or may be omitted. Additional method elements may also be performed as desired. As shown, the method may operate as follows.

As shown in FIG. 4, at 402, a wireless device, such as the mobile device 106 or the AP 112, may transmit one or more first packets according to a wireless communication protocol. For example, the wireless communication protocol may be a Wi-Fi protocol or other WLAN protocol. The one or more first packets may be communication packets addressed to a receiving device, which may be another wireless device, such as the mobile device 106 or the AP 112. For example, the one or more first packets may comprise a single frame, such as a single Media Access Control (MAC) Protocol Data Unit (MPDU) or a single MAC Service Data Unit (MSDU). As another example, the one or more first packets may comprise a series of aggregated frames, and may, for example, include one or more MAC headers. As yet another example, the one or more first packets may comprise a request-to send (RTS) frame. Yet other scenarios are also contemplated.

At 404, the wireless device may receive a second packet. In some scenarios, the second packet may the response packet comprises at least one of an Acknowledge (ACK) packet, a Block Acknowledge (BACK) packet, and a Clear-To-Send (CTS) packet.

At 406, the wireless device may determine that the receiving of 404 follows the transmitting of 402 by a specific duration of time. The wireless communication protocol may specify that a response packet responding to one or more packets is to follow transmission of the one or more packets by the specific duration of time. For example, the 802.11 standards specify the duration of time between a packet and its acknowledgement to be defined by a Short Interframe Space (SIFS). For example, the 802.11ac standard defines an SIFS of 16 μs, and the 802.11n standard defines an SIFS of either 10 is or 16 μs, depending on the frequency band used. It should be appreciated that the second packet has a duration over which it is received, and, further, that detection of the second packet by the wireless device may include some delay. Therefore, in some embodiments, determining that the "receiving" of 404 follows the transmitting of 402 by a specific duration of time $T_d$ may comprise determining that the second packet was detected following the transmitting of 402 by a duration approximately equal to $T_d$. In other embodiments, determining that the "receiving" of 404 follows the transmitting of 402 by a specific duration of time $T_d$ may comprise estimating that transmission of the second packet began following the transmitting of 402 by $T_d$.

At 408, the wireless device may determine that the second packet is a response packet responding to the one or more first packets based at least in part on the determining at 406 that the receiving follows the transmitting by the specific duration of time. For example, if the wireless communication protocol is the 802.11ac protocol, the wireless device may determine that the second packet is a response packet responding to the one or more first packets based at least in part on determining that the second packet was received approximately 16 is after transmission of the one or more first packets. In some scenarios, the response packet may comprise at least one of an Acknowledge (ACK) packet, a Block Acknowledge (BACK) packet, and a Clear-To-Send (CTS) packet.

In performing this determining at 408, the wireless device may not decode at least a portion of the second packet that identifies a packet type of the second packet. In the 802.11 standards, for example, the MAC header of a packet includes a Frame Control field, which contains Type and Subtype subfields. These subfields identify whether the packet is a response packet (such as an ACK, BACK, or CTS, for example). However, if one or more of these subfields is corrupted, then decoding and reading these subfields may cause a wireless device to erroneously conclude that the packet is not a response packet. Therefore, in some scenarios, the portion of the second packet that is not decoded may include a Frame Control field. In other scenarios, the portion of the second packet that is not decoded may include only a portion of the Frame Control field, such as the Type and/or Subtype subfields. In yet other scenarios, the portion of the second packet that is not decoded may include the entire second packet.

Thus, according to the method shown in FIG. 4, the wireless device may, at 408, forego decoding at least a portion of the second packet that identifies a packet type of the second packet, and instead depend at least in part on the determination at 406 that the receiving follows the transmitting by the specific duration of time in order to determine that the second packet is a response packet responding to the one or more first packets. The wireless device may therefore successfully receive the response packet, even if some or all of the response packet is corrupted.

At 410, the wireless device may conclude that the one or more first packets were successfully received, based on the determining at 408 that the second packet is a response packet responding to the one or more first packets.

Figure 6:
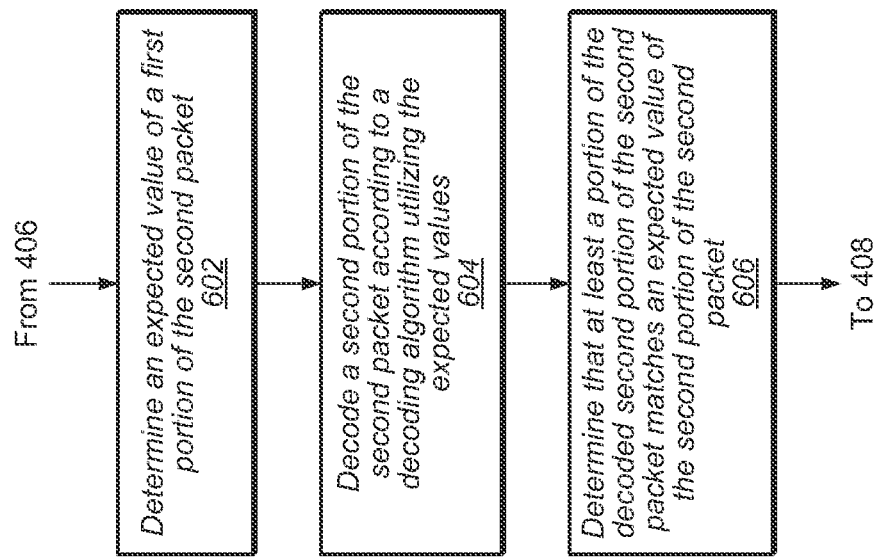
FIG. 6 is a flowchart diagram illustrating an exemplary method for successfully receiving a response packet by decoding a received packet using an expected value of the response packet, according to one scenario.
Figure 5:
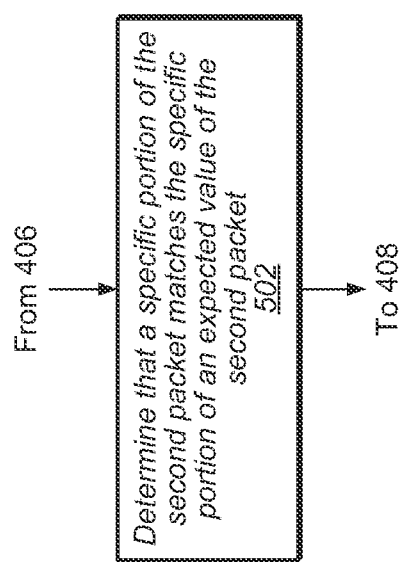
FIG. 5 is a flowchart diagram illustrating an exemplary method for successfully receiving a response packet by matching a value of a received packet to an expected value of the response packet, according to one scenario.
Figure 7:
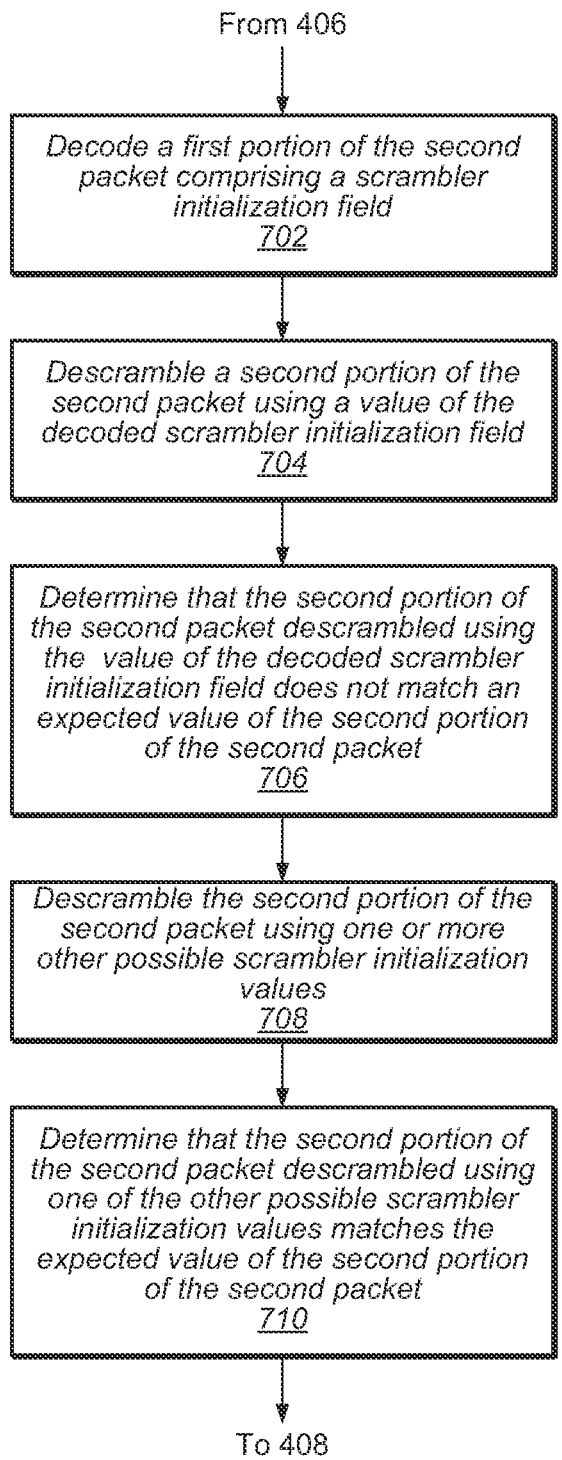
FIG. 7 is a flowchart diagram illustrating an exemplary method for successfully receiving a response packet by descrambling a received packet using an alternative value of a scrambler initialization field, according to one scenario.

In an environment with relatively little signal traffic, the method of FIG. 4 may work reliably where the wireless device makes the determination at 408 based entirely on the timing of receipt of the second packet. In other words, the wireless device may treat the second packet as a response packet based solely on when it was received. However, in more congested environments, this may not be reliable. FIGS. 5-7 therefore present additional sets of method elements that may optionally be used, separately or in any combination, to further assist in determining that the second packet is a response packet responding to the one or more first packets.

FIG. 5—Matching an Expected Value of the Response Packet

FIG. 5 is a flowchart diagram illustrating an exemplary method for successfully receiving a response packet by matching a value of a received packet to an expected value of the response packet, according to one scenario. The method shown in FIG. 5 illustrates an additional method element that may be added to the method shown in FIG. 4, as discussed above. The method element shown may be performed concurrently with an element of FIG. 4 or in a different order than shown, or may be omitted. Additional method elements may also be performed as desired. As shown, the method may operate as follows.

As shown in FIG. 5, at 502, the wireless device may determine that a specific portion of the second packet matches the specific portion of an expected value of the second packet. The determining at 408 that the second packet is a response packet responding to the one or more first packets may be further based on this determining at 502 that a specific portion of the second packet matches the specific portion of an expected value of the second packet.

For example, an 802.11 ACK may comprise several portions that may be known in advance (i.e., expected). Specifically, such a packet may include the following fields: Frame Control, Duration, Receiver Address (RA), and Frame Check Sequence (FCS). The Frame Control, Duration, and RA fields may all be expected to contain known values. A CTS may also include the same fields. A BACK may similarly include the following fields: Frame Control, Duration/ID, RA, Transmitter Address (TA), Block Acknowledge (BA) Control, BA Information, and FCS. The Frame Control, Duration/ID, RA, and TA fields may all be expected to contain known values. The wireless device may select any desired portion of the second packet corresponding to a portion of the expected response packet having an expected value, and compare the selected portion of the second packet with the expected value. The size and location of the selected portion may vary depending on implementation. Matching some portion of the second packet with an expected value provides further confirmation that the second packet is, in fact, the expected response packet, even if other portions of the second packet (such as the FCS field and/or the Subtype subfield of the Frame Control field, for example) are corrupted. In some scenarios, the wireless device may decode some or all of the second packet before making the comparison.

As another example, an 802.11 physical layer (PHY) header of a response packet may also include portions that may be known in advance. Thus, the specific portion of the second packet to be compared with an expected value may be a portion of the PHY header of the second packet. In some scenarios, some or all of the PHY header may first be decoded. In some scenarios, the wireless device may decode only the PHY header, and not the remainder of the second packet. The wireless device may then determine that a specific portion of the decoded PHY header of the second packet matches the specific portion of an expected value of the PHY header of the second packet. In this scenario, the determining at 408 that the second packet is a response packet responding to the one or more first packets may be further based on this determining that the specific portion of the decoded PHY header of the second packet matches the specific portion of the expected value of the PHY header of the second packet. In some scenarios, the specific portion of the decoded PHY header to be compared may comprise a field specifying a length of the packet. For example, the specific portion may comprise a Length subfield of an 802.11 Signal field.

FIG. 6—Decoding a Received Packet Using an Expected Value of the Response Packet In some scenarios, the second packet may be encoded using a convolutional code, in which each encoded data bit is dependent on previous data bits. The wireless device may therefore decode the second packet using a convolutional decoder. For example, the wireless device may decode the second packet using a Viterbi decoder, in which a candidate sequence of symbols (each representing one or more bits) may be selected by one or more Add-Compare-Select (ACS) nodes, and decoded bits may be determined based on, for example, tracing back through the candidate sequence of symbols.

In some scenarios, it may be advantageous to determine that a selected portion of the second packet matches an expected value, wherein the selected portion is not located at the beginning of the second packet. However, if a portion of the second packet that precedes the selected portion of the second packet is corrupted, then decoding of the selected portion may result in an incorrect value of the selected portion.

Additionally, it may be advantageous to determine that an FCS field of the second packet corresponds to an expected FCS field of an expected response packet. Generally, an FCS field may be included in a packet for error control. Specifically, the FCS field is selected such that a checksum of the packet is forced to a known constant. Typically, if a receiver determines that a checksum of a received packet does not match the pre-computed constant, then the receiver may conclude that the packet has been corrupted. However, if the received packet is a response packet, corruption of the packet may not be relevant; it may be sufficient to determine that the response packet was received, thereby indicating successful transmission of the one or more communication packets to which the response packet corresponds.

In these scenarios, the success rate of receiving a response packet may be improved by utilizing expected values of portions of the response packet, as illustrated in FIG. 6.

FIG. 6 is a flowchart diagram illustrating an exemplary method for successfully receiving a response packet by decoding a received packet using an expected value of the response packet, according to one scenario. The method shown in FIG. 6 illustrates additional method elements that may be added to the method shown in FIG. 4, as discussed above. Some of the method elements shown may be performed concurrently or in a different order than shown, or may be omitted. Additional method elements may also be performed as desired. As shown, the method may operate as follows.

As shown in FIG. 6, at 602, the wireless device may determine an expected value of a first portion of the second packet. As discussed above in connection with FIG. 5, various response packets may comprise several portions that may be known in advance (i.e., expected). For example, a MAC header of a response packet may contain portions with known values, such as Frame Control, Duration, and RA fields. As another example, a PHY header of a response packet may contain portions with known values, such as the Signal field, among other examples. Thus, the first portion of the second packet may comprise, for example, some or all of a MAC header and/or some or all of a PHY header of the second packet. An actual value of the first portion of the second packet may not be decoded.

At 604, the wireless device may decode a second portion of the second packet according to a decoding algorithm. The decoding algorithm may be configured to utilize a value in the first portion of a packet to decode the second portion of a packet. In some scenarios, the decoding algorithm may be a convolutional decoding algorithm, such as a Viterbi algorithm. At 604, the wireless device may decode the second portion of the second packet according to the decoding algorithm by utilizing the expected value of the first portion of the second packet, rather than the actual value of the first portion of the second packet. For example, the wireless device may use a Viterbi decoder to decode received packets, but may adapt the decoder's normal operation such that, for the first portion of the second packet, symbols are selected from the expected value of the first portion, rather than from the output of an ACS node. Because the actual value of the first portion is not decoded or used in decoding the second portion, any corruption of the first portion that may have occurred during transmission is irrelevant.

At 606, the wireless device may determine that at least a portion of the decoded second portion of the second packet matches an expected value of a corresponding portion of the second portion of the second packet. The determining at 408 that the second packet is a response packet responding to the one or more first packets may be further based on the determining at 606 that the decoded second portion of the second packet matches the expected value of the second portion of the second packet. Specifically, if the decoded second portion of the second packet matches the expected value of the second portion of the second packet, after having been decoded using the expected value of the first portion of the second packet, then it may be reasonable to conclude that the second packet is, in fact, the expected response packet, even if other portions of the second packet are corrupted.

Specific non-limiting examples of the method shown in FIG. 6 will now be explained.

In one scenario, the wireless device may expect to receive an 802.11 ACK at the time when the second packet is received. For example, the wireless device may have determined at 406 that the second packet follows the transmitting of the one or more first packets by approximately the SIFS defined by the appropriate 802.11 standard. The second portion of the second packet may consist of a portion of the second packet that is expected to contain an FCS field of the expected ACK, wherein this expectation is based on the assumption that the second packet is the expected 802.11 ACK. The first portion of the second packet may consist of a portion of the second packet that is expected to contain a MAC header of the expected ACK. The determining, at 602, an expected value of the first portion of the second packet may thus comprise determining the expected value of the MAC header of the expected ACK. The MAC header may thus not be decoded. At 604, the wireless device may decode the FCS field according to the Viterbi algorithm typically used for decoding 802.11 signals, with the exception that the Viterbi decoder may utilize some or all of the bits from the MAC header of the expected ACK (i.e., the expected value of the first portion of the second packet), rather than bits from the actual value of the first portion. At 606, the wireless device may determine that the decoded FCS field (i.e., the decoded value of the second portion of the second packet) matches an expected value of the FCS field of the expected ACK. This may be done in any of a variety of ways. For example, the wireless device could expressly calculate an expected FCS field, and compare it with the decoded FCS field. Alternatively, the wireless device may verify that the decoded FCS field, together with the expected value of the MAC header, yields the correct checksum. In that case, the wireless device may determine by inference that the decoded FCS field matches the expected value of the second portion of the second packet. Determining that the FCS field matches the expected value verifies that the preceding portions of the second packet match the MAC header of the expected ACK.

In another, similar, scenario, the wireless device may expect to receive an 802.11 BACK, and the second portion of the second packet may consist of a portion of the second packet that is expected to contain a BA Control field, a BA Information field, and an FCS field of the expected BACK. The first portion of the second packet may consist of a portion of the second packet that is expected to contain a MAC header of the expected BACK. Similarly to the preceding example, 602 may comprise determining the expected value of the MAC header of the expected BACK. The MAC header may thus not be decoded. At 604, the wireless device may decode the second portion according to the Viterbi algorithm typically used for decoding 802.11 signals, with the exception that the Viterbi decoder may utilize some or all of the bits from the MAC header of the expected BACK (i.e., the expected value of the first portion of the second packet), rather than bits from the actual value of the first portion. At 606, the wireless device may determine that the decoded FCS field (i.e., a portion of the decoded value of the second portion of the second packet) matches an expected value of the FCS field of the expected BACK (the expected value of a corresponding portion of the second portion). For example, as in the previous example, the wireless device may verify that the decoded second portion of the second packet, together with the expected value of the MAC header, yield the correct checksum, thus determining by inference that the decoded FCS field matches the expected value of the FCS field.

It should be understood that the preceding scenarios are only exemplary. Other scenarios are also envisioned. Generally, the first portion of the second packet may be any portion corresponding to a portion of the expected response packet that has an expected value. The second portion of the second packet may be any portion that may be decoded using a value from the first portion of the second packet. Advantageously, the second portion may correspond to a portion of the expected response packet that may provide further indication that the second packet is, in fact, the expected response packet.

FIG. 7—Descrambling Using an Alternative Scrambler Initialization Value

In some scenarios, data decoding of a packet may involve de-scrambling. For example, in the 802.11ac standard, the PSDU is scrambled before being encoded with a convolutional code. In such scenarios, a scrambler initialization value may be included in the packet. In some scenarios, the scrambler initialization value may be corrupted during transmission. This may typically cause a device receiving the packet to incorrectly descramble the packet, which may result in the packet failing an error check, even if other portions of the packet are uncorrupted. In these scenarios, the success rate of receiving a response packet may be improved by attempting descrambling with alternative scrambler initialization values, as illustrated in FIG. 7.

FIG. 7 is a flowchart diagram illustrating an exemplary method for successfully receiving a response packet by descrambling a received packet using an alternative value of a scrambler initialization field, according to one scenario. The method shown in FIG. 7 illustrates additional method elements that may be added to the method shown in FIG. 4, as discussed above. Alternatively, the method shown in FIG. 7 may be used independently of some or all of the steps shown in FIG. 4. Some of the method elements shown may be performed concurrently or in a different order than shown, or may be omitted. Additional method elements may also be performed as desired. As shown, the method may operate as follows.

As shown in FIG. 7, at 702, the wireless device may decode at least a first portion of the second packet. The first portion may comprise a scrambler initialization field. For example, the 802.11 ac standard defines a Data field following the PHY header, the Data field comprising a 7-bit Scrambler Initialization field and a PSDU, among other fields. The PSDU may be scrambled using a scrambler having the initial value shown in the Scrambler Initialization field. In some scenarios, the first portion of the second packet may be decoded using a convolutional decoder, such as a Viterbi decoder.

At 704, the wireless device may descramble at least a second portion of the second packet using a value of the decoded scrambler initialization field. In some scenarios, the second portion may first be decoded.

At 706, the wireless device may determine that a value of the second portion of the second packet, which was descrambled using the value of the decoded scrambler initialization field, does not match an expected value of the second portion of the second packet. This may be done in any of a variety of ways. For example, in some scenarios, the second portion of the second packet may correspond to a portion of an expected response packet having a predictable value, such as a duration and/or address field. In such scenarios, the predictable value could be expressly compared with the value of the descrambled second portion of the second packet. In other scenarios, the second portion of the second packet may correspond to a FCS field of the expected response packet. In such scenarios, determining that the value of the descrambled second portion does not match an expected value of the second portion may be performed expressly or by inference. For example, the wireless device may expressly calculate an expected FCS field of the expected response packet, and compare it with the descrambled value of the second portion of the second packet. Alternatively, the wireless device may verify that the descrambled second portion of the second packet, together with the expected value of the MAC header of the expected response packet, yields the correct checksum. In that case, the wireless device may determine by inference that the value of the descrambled second portion of the second packet matches the expected value of the second portion of the second packet.

At 708, the wireless device may descramble at least the second portion of the second packet using one or more other possible scrambler initialization values, different from the value of the decoded scrambler initialization field. This may be performed in response to the determining, at 706, that the second portion of the second packet descrambled using the value of the decoded scrambler initialization field does not match the expected value of the second portion of the second packet. In the example of the 802.11 standard, the 7-bit scrambler initialization field allows for 127 possible scrambler initialization values. The wireless device may descramble the second portion of the second packet using any one or more of these possible values.

At 710, the wireless device may determine that the second portion of the second packet descrambled using one of the one or more other values of the decoded scrambler initialization field matches the expected value of the second portion of the second packet. The determining, at 408, that the second packet is a response packet responding to the one or more first packets may be further based on the determining, at 710, that the second portion of the second packet descrambled using one of the one or more other values of the decoded scrambler initialization field matches the expected value of the second portion of the second packet.

In some scenarios, 708 and 710 may be performed concurrently or iteratively. For example, in one scenario, the wireless device may descramble at least the second portion of the second packet using one other possible scrambler initialization value, and test for a match to the expected value. The wireless device may repeat this process using different possible scrambler initialization values until it has either determined a match or exhausted all possible scrambler initialization values. Alternatively, the wireless device may repeat this process using different possible scrambler initialization values until it has either determined a match or reached the end of a window of time available for descrambling. In another scenario, the wireless device may, at 708, descramble at least the second portion of the second packet using every possible scrambler initialization value, and then determine at 710 whether any of the descrambled values match the expected value.

In yet another scenario, the wireless device may attempt to identify possible scrambler initialization values that are likely to be correct, based on any available criteria. For example, the wireless device may leverage expected values of portions of the second packet to determine a likely scrambler initialization value, as follows.

A portion of a MAC frame of the second packet may be split into blocks each having a length matching a length of the scrambler initialization field. In some embodiments, the blocks may overlap. In the present exemplary scenario, a length of 7 bits will be assumed, consistent with the 802.11 standards. However, it should be appreciated that other lengths may be appropriate in other scenarios. The portion of the MAC frame to be split into blocks may consist of a portion having an expected value, such as the MAC header, for example.

For each block, the wireless device may XOR the expected value with the actual value of the decoded block. It should be noted that the actual value of the decoded block to be used in the XOR operation is still scrambled at the time the XOR is performed. Thus, if the second packet is, in fact, the expected response packet, and if the block was not corrupted during transmission, the XOR operation yields the scrambler value for descrambling the block.

The scrambler value for descrambling a given block may then be mapped to a corresponding scrambler initialization value based on the position of the given block. For example, the wireless device may maintain a constant table (S) of the scrambler sequence. Where the scrambler initialization value is 7 bits, the scrambler sequence table S may comprise 127 entries, each 7 bits long. The wireless device may further maintain a constant inverse lookup table (M) mapping each possible scrambler value to an index in S, such that for any scrambler value b: S(M(b))=b. Using these two tables, the scrambler initialization value corresponding to the identified scrambler value b of a block at position k may be identified as S(M(b)–k mod 127).

Assuming that the second packet is, in fact, the expected response packet, this process will yield the same scrambler initialization value for each block that was not corrupted during transmission. More specifically, the scrambler initialization value identified for each uncorrupted block will be the correct scrambler initialization value for descrambling the MAC frame. Thus, if the scrambler initialization values calculated for all blocks are the same, the wireless device may determine that the calculated scrambler initialization value is correct, and that the second packet is, in fact, the expected response packet.

However, if one or more of the blocks was corrupted during transmission, then the scrambler initialization values calculated for all blocks may not be the same. In this case, the wireless device may determine one or more likely scrambler initialization values by building a histogram of the calculated scrambler initialization values, and selecting the one or more values with the highest number of occurrences. For example, the wireless device may descramble at least the second portion of the second packet using the one or more calculated scrambler initialization values having the highest number of occurrences, and test for a match to the expected value of the second portion of the second packet for each.

It should be appreciated that the exemplary process of the preceding scenario attempting to identify possible scrambler initialization values that are likely to be correct may have application independent of one or more of the steps of the method shown in FIG. 4. For example, this procedure may be used to determine a correct scrambler initialization value of a response packet, to allow for robust descrambling of unknown portions of a response packet, such as a BA Information field of an 802.11 BACK. Thus, this process may be useful independent of steps 406 and/or step 408.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for wireless communication, comprising: by a wireless device:
   transmitting one or more first packets according to a wireless communication protocol;
   receiving a second packet;
   determining that the receiving follows the transmitting by a specific duration of time, wherein the wireless communication protocol specifies that a response packet responding to one or more packets is to follow transmission of the one or more packets by the specific duration of time;
   determining an expected value of a first portion of the second packet, wherein the first portion of the second packet comprises at least a portion of a Media Access Control (MAC) header and an actual value comprised in the first portion of the second packet is not decoded;
   decoding a second portion of the second packet according to a decoding algorithm, wherein the decoding algorithm utilizes a value in the first portion to decode the second portion, wherein the decoding is performed by utilizing the expected value of the first portion rather than the actual value of the first portion;
   determining that at least a portion of the decoded second portion of the second packet matches an expected value of a corresponding portion of the second portion of the second packet; and
   determining that the second packet is a response packet responding to the one or more first packets based at least in part on the determining that the receiving follows the transmitting by the specific duration of time and the determining that the decoded second portion of the second packet matches the expected value of the second portion of the second packet, wherein the wireless device does not decode at least a portion of the second packet that identifies a packet type of the second packet.

2. The method of claim 1, wherein the response packet comprises at least one of an Acknowledge (ACK) packet, a Block Acknowledge (BACK) packet, and a Clear-To-Send (CTS) packet.

3. The method of claim 2, further comprising:
   concluding, by the wireless device, that the one or more first packets were successfully received, based on the determining that the second packet is a response packet responding to the one or more first packets.

4. The method of claim 1, wherein the portion of the second packet that is not decoded includes an 802.11 Frame Control field.

5. The method of claim 1, further comprising:
   decoding only a physical layer (PHY) header of the second packet; and
   determining that a specific portion of the decoded PHY header of the second packet matches the specific portion of an expected value of the PHY header of the second packet;
   wherein the determining that the second packet is a response packet responding to the one or more first packets is further based on the determining that the specific portion of the decoded PHY header of the second packet matches the specific portion of the expected value of the PHY header of the second packet.

6. The method of claim 5, wherein the specific portion of the decoded PHY header comprises a field specifying a length of the packet.

7. The method of claim 1, wherein the second portion of the second packet comprises a frame check sequence (FCS) field.

8. The method of claim 1, wherein the portion of the second packet that is not decoded comprises a portion of the second packet that identifies the second packet as a response packet.

9. A wireless device for receiving a response packet, the wireless device comprising:
   a radio configured to transmit and receive wireless communication packets; and
   a processor operably coupled to the radio, the processor configured to cause the wireless device to:
      transmit one or more first packets according to a wireless communication protocol;
      receive a second packet;
      determine that the receiving follows the transmitting by a specific duration of time, wherein the wireless communication protocol specifies that a response packet responding to one or more packets is to follow transmission of the one or more packets by the specific duration of time;
      determine an expected value of a first portion of the second packet, wherein the first portion of the second packet comprises at least a portion of a Media Access Control (MAC) header and an actual value comprised in the first portion of the second packet is not decoded;
      decode a second portion of the second packet according to a decoding algorithm, wherein the decoding algorithm utilizes a value in the first portion to decode the second portion, wherein the decoding is performed by utilizing the expected value of the first portion rather than the actual value of the first portion;
      determine that at least a portion of the decoded second portion of the second packet matches an expected value of a corresponding portion of the second portion of the second packet; and determine that the second packet is a response packet responding to the one or more first packets based at least in part on the determining that the receiving follows the transmitting by the specific duration of time and on the determining that the decoded second portion of the second packet matches the expected value of the second portion of the second packet, wherein the wireless device does not decode at least a portion of the second packet that identifies a packet type of the second packet.

10. The wireless device of claim 9, wherein the processor is further configured to cause the wireless device to:
conclude that the one or more first packets were successfully received, based on the determining that the second packet is a response packet responding to the one or more first packets.

11. The wireless device of claim 9, wherein the processor is further configured to cause the wireless device to:
decode only a physical layer (PHY) header of the second packet; and
determine that a specific portion of the decoded PHY header of the second packet matches the specific portion of an expected value of the PHY header of the second packet;
wherein the determining that the second packet is a response packet responding to the one or more first packets is further based on the determining that the specific portion of the decoded PHY header of the second packet matches the specific portion of the expected value of the PHY header of the second packet.

12. The wireless device of claim 9, wherein the portion of the second packet that is not decoded comprises a portion of the second packet that identifies the second packet as a response packet.

13. The wireless device of claim 9, wherein the portion of the second packet that is not decoded comprises an 802.11 Frame Control field.

14. A non-transitory computer-readable medium comprising program instructions executable by a processor of a wireless device to cause the wireless device to:
transmit one or more first packets according to a wireless communication protocol;
receive a second packet;
determine that the receiving follows the transmitting by a specific duration of time, wherein the wireless communication protocol specifies that a response packet responding to one or more packets is to follow transmission of the one or more packets by the specific duration of time;
determine an expected value of a first portion of the second packet, wherein the first portion of the second packet comprises at least a portion of a Media Access Control (MAC) header and an actual value comprised in the first portion of the second packet is not fully decoded;
decode a second portion of the second packet according to a decoding algorithm, wherein the decoding algorithm utilizes a value in the first portion to decode the second portion, wherein the decoding is performed by utilizing the expected value of the first portion rather than the actual value of the first portion;
determine that at least a portion of the decoded second portion of the second packet matches an expected value of a corresponding portion of the second portion of the second packet; and
determine that the second packet is a response packet responding to the one or more first packets based at least in part on the determining that the receiving follows the transmitting by the specific duration of time and on the determining that the decoded second portion of the second packet matches the expected value of the second portion of the second packet, wherein the wireless device does not decode at least a portion of the second packet that identifies a packet type of the second packet.

15. The non-transitory computer-readable medium of claim 14, wherein the program instructions are further executable by the processor to cause the wireless device to:
conclude that the one or more first packets were successfully received, based on the determining that the second packet is a response packet responding to the one or more first packets.

16. The non-transitory computer-readable medium of claim 14, wherein the program instructions are further executable by the processor to cause the wireless device to:
decode only a physical layer (PHY) header of the second packet; and
determine that a specific portion of the decoded PHY header of the second packet matches the specific portion of an expected value of the PHY header of the second packet;
wherein the determining that the second packet is a response packet responding to the one or more first packets is further based on the determining that the specific portion of the decoded PHY header of the second packet matches the specific portion of the expected value of the PHY header of the second packet.

17. The non-transitory computer-readable medium of claim 14, wherein the portion of the second packet that is not decoded comprises a portion of the second packet that identifies the second packet as a response packet.

18. The non-transitory computer-readable medium of claim 14, wherein the portion of the second packet that is not decoded comprises an 802.11 Frame Control field.

* * * * *